United States Patent [19]
Griffiths

[11] Patent Number: 5,829,764
[45] Date of Patent: *Nov. 3, 1998

[54] SEMI-TRAILING ARM REAR SUSPENSION FOR A VEHICLE

[75] Inventor: Adrian Michael Griffiths, Solihull, England

[73] Assignee: Rover Group Limited, Birmingham, England

[ * ] Notice: This patent issued on a continued prosecution application filed under 37 CFR 1.53(d), and is subject to the twenty year patent term provisions of 35 U.S.C. 154(a)(2).

[21] Appl. No.: 679,469

[22] Filed: Jul. 15, 1996

[30] Foreign Application Priority Data

Jul. 21, 1995 [GB] United Kingdom .................. 9514974

[51] Int. Cl.⁶ .................................................. B60G 7/02
[52] U.S. Cl. ...................................... 280/5.52; 280/5.524
[58] Field of Search .................................. 280/96.1, 663, 280/673, 675, 691, 5.52, 5.521, 5.522, 5.523, 5.524

[56] References Cited

U.S. PATENT DOCUMENTS

| | | | |
|---|---|---|---|
| 4,715,614 | 12/1987 | Kijima et al. | 280/701 |
| 5,009,449 | 4/1991 | Edahiro et al. | 280/690 |
| 5,026,091 | 6/1991 | Lee | 280/675 |
| 5,048,860 | 9/1991 | Kanai et al. | 280/691 |
| 5,102,159 | 4/1992 | Sato et al. | 280/663 |
| 5,193,843 | 3/1993 | Yamamoto et al. | 280/675 |
| 5,507,510 | 4/1996 | Kami et al. | 280/96.1 |

FOREIGN PATENT DOCUMENTS

| | | |
|---|---|---|
| 0 071 250 | 2/1983 | European Pat. Off. . |
| 0 071 250 A2 | 9/1983 | European Pat. Off. . |
| 0 136 563 A2 | 4/1985 | European Pat. Off. . |
| 0 170 220 A2 | 2/1986 | European Pat. Off. . |
| 0 392 891 B1 | 10/1990 | European Pat. Off. . |
| 0 655 355 | 11/1993 | European Pat. Off. . |
| 2 701 236 | 2/1993 | France . |
| 2 706 370 | 6/1993 | France . |
| 31 19 777 | 5/1981 | Germany . |
| 3 307 825 | 3/1983 | Germany . |
| 3 901 540 | 1/1989 | Germany . |
| 41 17 017 | 5/1991 | Germany . |
| 41 29 376 | 9/1991 | Germany . |
| 2 147 553 A | 5/1985 | United Kingdom . |
| 2 177 983 A | 2/1987 | United Kingdom . |
| 2 222 119 A | 2/1990 | United Kingdom . |
| 2 230 238 | 10/1990 | United Kingdom . |
| 92/16386 | 10/1992 | WIPO . |

Primary Examiner—Kenneth R. Rice
Attorney, Agent, or Firm—Davis and Bujold

[57] ABSTRACT

The suspension comprises a wheel support constrained to move about an axis of rotation relative to the vehicle body by a linkage arrangement connected between the wheel support and mountings on the vehicle body. The linkage arrangement has first and second arm members arranged such that imaginary extensions thereof intersect at a point outside of the centre of a wheel mounted on said wheel support and to the rear of the axis of rotation of the wheel and has a third linkage between said vehicle body and said wheel support which is connected to the vehicle body at a position that lies outwardly from the position at which the second arm is coupled to the vehicle body and to the rear of an imaginary line extending between the position of connection of the first arm to the body and the position of connection of the second arm to the vehicle body.

19 Claims, 6 Drawing Sheets

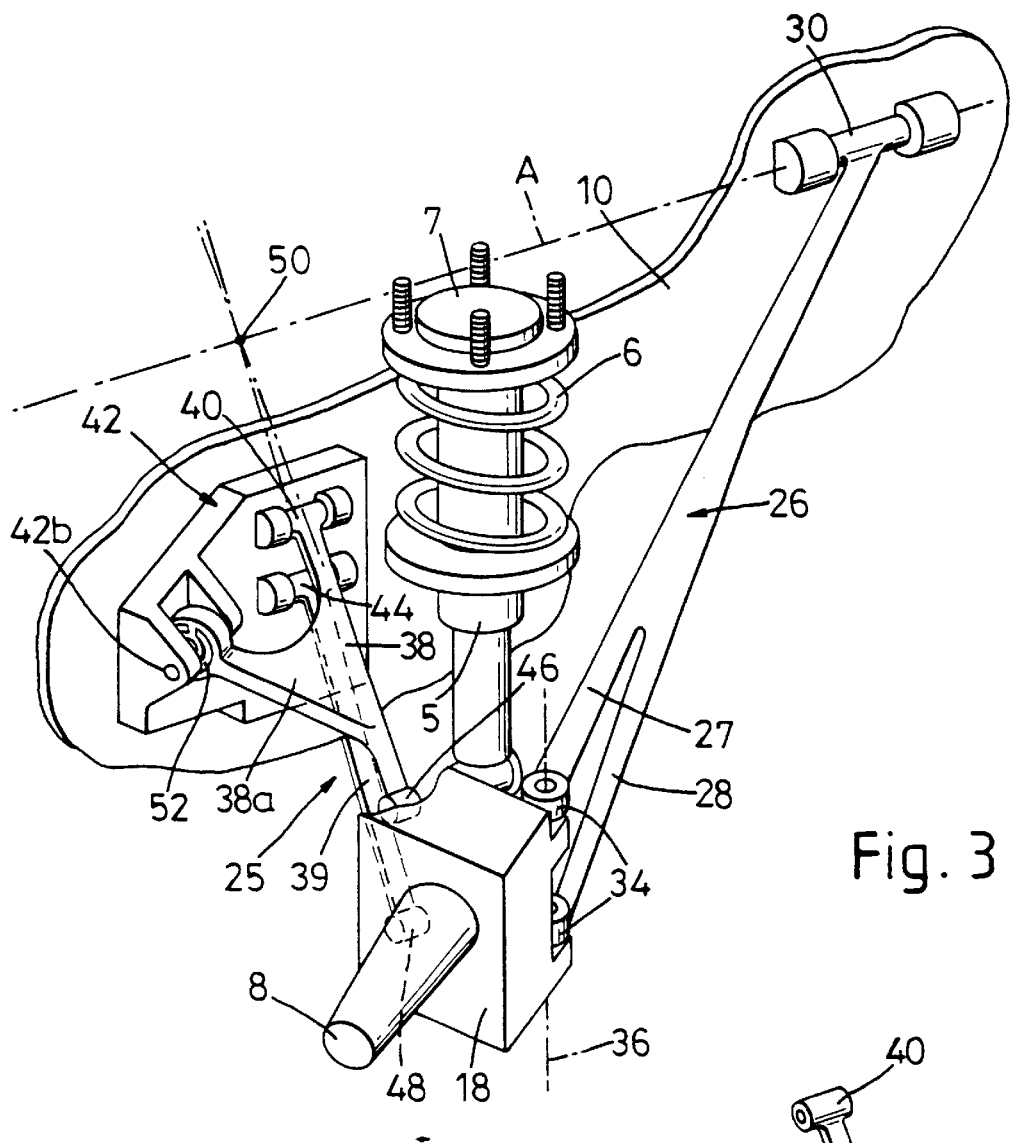
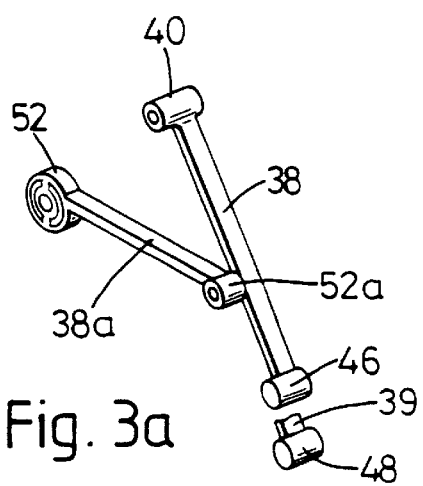
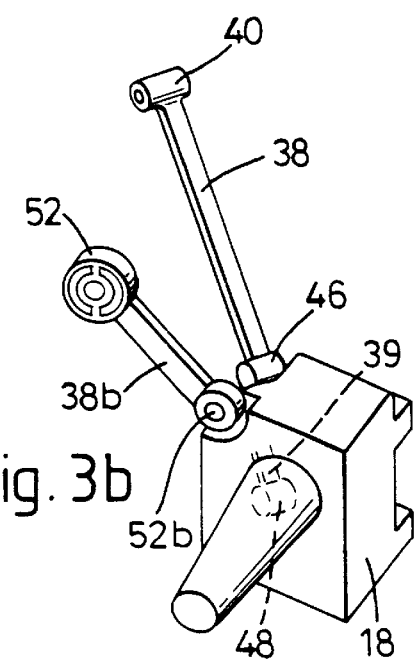
Fig. 3
Fig. 3a
Fig. 3b

SEMI-TRAILING ARM REAR SUSPENSION FOR A VEHICLE

TECHNICAL FIELD OF THE INVENTION

This invention relates to a semi-trailing arm rear suspension for a motor vehicle and is primarily concerned with a rear suspension for a front wheel drive vehicle.

BACKGROUND OF THE INVENTION

In order to simplify the manufacture of a given range of vehicles, it is useful to have as many components as possible common to all the vehicles of the range. If, for example, a common rear suspension could be produced for a range of vehicles embracing sports, estate and saloon cars and for low cost utility vehicles, the overall manufacturing costs would be reduced.

However, suspension requirements for a such a range of vehicles can differ significantly from vehicle to vehicle. For example, suspension compliance characteristics are critical on sports vehicles, which may be subjected to frequent and heavy braking and fast cornering, but are generally of less significance on estate and saloon cars and of very little importance on low cost utility vehicles. Similarly uncontrolled rear wheel steering and camber control are important factors on sports cars and likewise on estate and saloon cars but are of less significance on the low cost utility vehicle. Camber compensation for roll is, again, an important requirement for sports cars but is of lesser importance on saloon and estate cars and of no particular importance for the low cost utility type vehicle.

It has not hitherto been possible to produce a suspension which, at one end of the range, can be tuned to provide the requirements of a sports vehicle and which, at the other end, will suit the requirements of a low cost utility vehicle.

From several aspects a semi-trailing arm suspension is ideal as such a suspension can easily be positioned under the floor which will, in turn, lead to a wide load carrying space within the vehicle which is ideal for saloon and estate cars.

A typical prior art semi-trailing arm rear suspension is shown diagrammatically in plan view in FIG. 1 of the accompanying drawings.

A sub-frame 10 suitably attached to a chassis or body 11 of the vehicle carries bearings 12 for two trailing arms 14. The bearings 12 define respective axes of pivoting 16 for the arms 14 which are inclined at an angle "a" with respect to an axis extending laterally with respect to the vehicle body. This angle of inclination is known in the art as the "angle of semi-trail".

The arms 14 carry wheel mountings 18 at their outer ends for road wheels 20.

It is a problem with this type of arrangement that during vertical movement of the wheels 20, the wheels generate a certain amount of bump steer and camber change which can be undesirable factors depending upon the type of vehicle to which the suspension is fitted.

Although the angle of semi-trail can be optimised to provide a reasonable compromise from vehicle to vehicle, the result will not normally be ideal for many vehicles in a range.

It is therefore a first object of the present invention to provide an improved semi-trailing arm suspension which will enable the suspension to meet the requirements of a typical range of vehicles.

It is a second object of this invention to provide a suspension that can be tailored in an economical manner to suit various different types of vehicle.

SUMMARY OF THE INVENTION

According to the invention there is provided a semi-trailing arm suspension for a vehicle, for suspending the body of said vehicle with respect to a wheel of said vehicle, the suspension having a wheel support member to rotatably support said road wheel about a horizontal axis extending in a direction lateral to the vehicle body, a spring means for biasing said wheel support member in a downwards direction with respect to said vehicle body, the wheel support being constrained to move about an axis of rotation relative to the vehicle body by a linkage arrangement comprising of a first arm member having an inboard end coupled to part of the vehicle body for rotation with respect thereto about a generally horizontal rotational axis and an outer end coupled to said wheel support member, the first arm member extending in a generally lateral direction rearwardly and outwardly with respect to the vehicle body from said inboard end to said outboard end and a second arm member having a first end coupled to part of the vehicle body for rotation with respect thereto about a generally horizontal axis and a second end coupled to said wheel support member, the first and second arm members converging such that imaginary lines passing through the positions of coupling of the first and second arms to the wheel support and vehicle body intersect at a point outside of the centre of the wheel and to the rear of the axis of rotation of the wheel and a third linkage between said vehicle body and said wheel support, the third linkage being connected to part of the vehicle body at a position that lies outwardly from the position at which the second arm is coupled to the vehicle body and to the rear of an imaginary line extending between the position of connection of the first arm to the body and the position of connection of the second arm to the vehicle body.

With a prior art semi-trailing arm rear suspension, compliance in the suspension due to lateral or longitudinal loading at the wheel centre due to braking or cornering will tend to cause toe-out of the wheel which is an undesirable characteristic for a rear suspension.

By arranging in the suspension according to the invention for the first and second arms to converge towards a point which lies outboard and to the rear of the centre of the wheel of the vehicle during heavy braking the wheel tends to "toe in" which helps to cancel out the toe out due to compliance in the suspension.

The pivotal connection between the first arm and the wheel mounting is preferably arranged such that during substantially vertical movement of the wheel mounting, the wheel mounting steers in a controlled manner.

In addition by arranging for the position of connection of the third linkage to the vehicle to be made at a position which lies outboard of the position of connection of the second arm to the vehicle and to the rear of an imaginary line extending between the position of connection of the first arm to the body and the position of connection of the second arm to the vehicle body, vertical movement of the wheel will cause the wheel to undergo a steering movement causing it to toe-out. In that way, any tendency for the wheel to toe-in during vertical movement of the wheel can be compensated by a toe-out movement which simultaneously takes place due to the action of the third linkage.

The connection of the third linkage to the wheel support may be made via the second arm.

The third linkage and the second arm may be formed as a single structural member.

The connection between the third linkage and the vehicle body may be made by means of a compliance bush.

The third linkage may be formed by a separate structural member coupled to the body of the vehicle by a compliance bush and to the wheel support by a pivot means.

The third linkage may be formed by a separate structural member coupled to the wheel support by a compliance bush and to the body of the vehicle by a pivot means.

The second arm may be connected to the wheel support at two vertically separated positions.

The second arm may be connected to the wheel support for rotation about a vertical axis.

The linkage arrangement may further comprise a third arm having a first end coupled to part of the vehicle body for rotation with respect thereto about a generally horizontal axis and a second end coupled to said wheel support member, the second and third arm members converging such that imaginary extensions thereof intersect at a point of intersection which lies forwardly with respect to an imaginary line extending from the position of connection of the first arm to the vehicle body and the position of connection of the second arm to the vehicle body so that the axis of rotation about which the wheel support is constrained to move relative to the vehicle body extends from said point of intersection to the position of connection of the first arm to the body.

The positions of connection of the second and third arms to the vehicle body may be vertically disposed with respect to each other.

The positions of connection of the second and third arms to the wheel support may be vertically disposed with respect to each other The second and third arms may be connected to the vehicle body by a mounting means which can be selected from a number of mounting means each of which provides a different vertical distance between the positions of connection of the second and third arms thereby allowing the position of the point of intersection to be selected to suit the dynamic charateristics required for a particular vehicle of a range of vehicles.

This has the advantage that the position of the point of intersection and hence the angle of semi-trail can be easily changed to suit a particular vehicle of the range.

BRIEF DESCRIPTION OF THE DRAWINGS

A semi-trailing arm suspension in accordance with the invention will now be described by way of example with reference to the further accompanying drawings in which:

FIG.3: is a diagrammatic perspective view of the semi-trailing arm suspension shown in FIG. 2;

FIG.3a: shows an alternative configuration of the third linkage shown in FIG. 3;

FIG.3b: shows an alternative configuration of the aforesaid control means to that shown in FIG. 3;

DETAILED DESCRIPTION OF THE INVENTION

Figure 1:
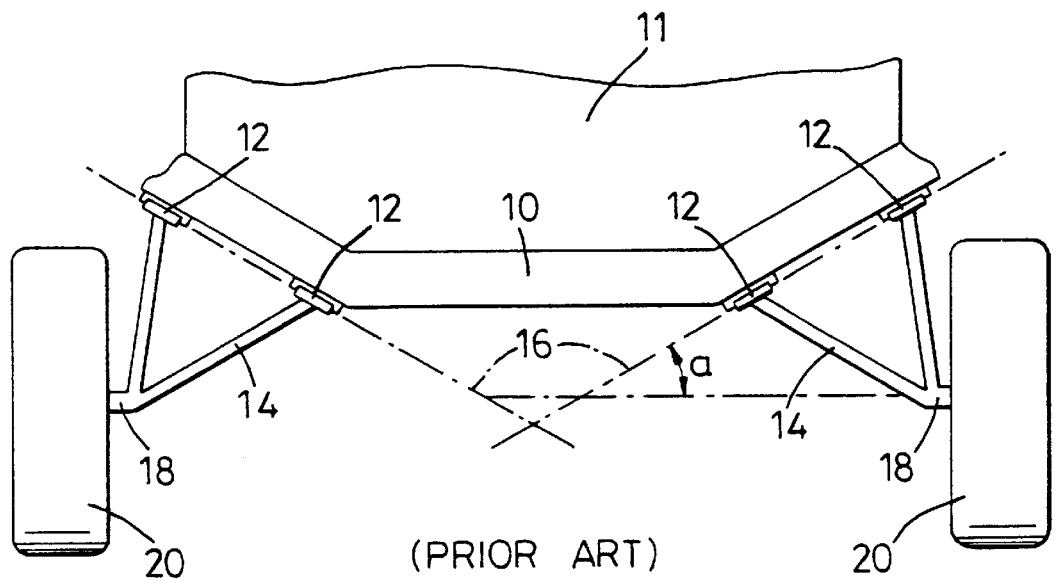
FIG.1: is a diagrammatic plan view of a prior art semi-trailing arm rear suspension.

In the following description, parts corresponding to parts shown in FIG. 1 carry the same reference numerals or the same reference numeral with the addition of 100.

Figure 2:
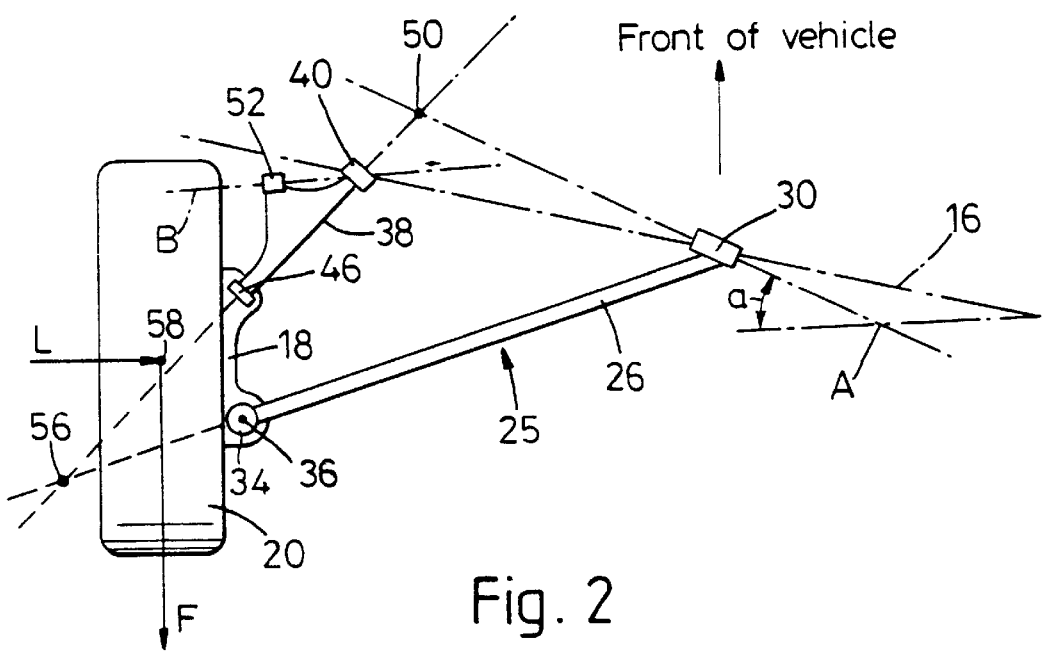
FIG.2: is a diagrammatic plan view of a first embodiment of a rear suspension in accordance with the invention for the left hand side of the vehicle.

In FIGS. 2 and 3, the semi-trailing arm suspension comprises an arm arrangement 25 comprising a first arm 26 having and upper and lower sections 27, 28 which extends in a generally lateral direction rearwardly and outwardly from where it is connected at an inboard end via a suitable bearing 30 to a vehicle sub-frame 10 to an outboard end where the upper and lower arm sections 27, 28 are connected to the wheel support 18 by vertically spaced bearings 34.

The vertically spaced bearings 34 define a vertical axis of pivoting 36 about which wheel support 18 can rotate a small amount. A stub axle 8 extends outwardly from the wheel support 18 to rotatably locate a road wheel 20 (not shown on FIG. 3).

The bearing 30 linking the arm 26 to the body 10 provides the aforesaid first pivot.

Between the wheel support 18 and the vehicle body there is disposed a spring means in the form of a substantially vertically extending strut assembly 7 which is used to compliantly support the weight of the vehicle body. The strut assembly 7 comprises of a coil spring 6 and an oleo damper 5 which is pivotally connected to the wheel support 18 at its lower end so as to allow a certain amount of angular movement with respect to the wheel support 18.

The arm arrangement 25 also comprises second and third arms 38, 39 which are vertically spaced apart. The second arm 38 is connected via a bearing 40 to a mounting member 42 attached to the sub-frame 10 mounted on the vehicle body or chassis. The third arm 39 is also connected to the mounting member 42 by a bearing 44. The bearings 40, 44 are vertically spaced apart and provide the aforesaid second and third pivots. The opposite end of the arm 38 is connected to the wheel support 18 by a fourth bearing 46 and the third arm 39 is connected to the wheel support 18 by a fifth bearing 48. The bearings 46, 48 provide the aforesaid fourth and fifth pivots and are vertically spaced by a distance greater than the vertical spacing between bearings 40, 44. The bearings 40, 44, 46 and 48 provide parallel axes of pivoting.

The second arm 38 includes an arm section 38a carrying a compliance bush 52 of known kind outboard of the bearing 40 and which is pivotally connected at 42b to the mounting member 42. A compliance bush is an attachment means having inner and outer members separated by a resilient material to allow a considerable amount of radial movement of the inner member relative to the outer member so that vibrations an shocks can be absorbed. The compliance bush 52 and arm 38a together provide the aforesaid control means by providing a third linkage between the wheel support 18 and the vehicle body. Pivotal movement of the second arm 38 takes place about an axis B (FIG. 4) passing through the bearing 40 and the pivot 42b for the compliance bush 52. The aforesaid bearings 30, 40 and 44 are preferably capable of permitting pivotal movement in more than one plane. If desired the bearings may provide compliance to absorb certain road irregularities. If desired, the compliance bush 52 could instead be mounted on the third arm 39 in the same manner as it is shown mounted on the second arm 38.

As shown in FIG. 3a, the arm section 38a can be pivotally connected to the arm 38 by a bearing 52a and, as shown in FIG. 3b, the compliance bush 52 can instead be connected by an arm 38b directly to the wheel support 18. The arm 38b is connected to the wheel support 18 by a bearing 52b. In FIGS. 3a and 3b, the positions of the compliance bush 52 and the bearings 52a, 52b could be reversed in each case.

It will be noted that the arms 38, 39 converge towards each other and lines passing through the bearings 46, 40 and 48, 44 intersect at a virtual point 50.

It can be seen that the wheel support 18 pivots about an axis A passing through the bearing 30 of arm 26 and the point 50 which is a virtual centre of pivoting for the arms 38, 39. In a normal semi-trailing arm suspension, all pivoting would take place along the axis 16 as shown in FIG. 1 the equivalent of which is shown at 16 in FIG. 2.

It will be appreciated that by selecting the vertical distance between the bearings 40, 44 the position of the virtual pivot 50 and, therefore, the angle of semi-trail "a" can be set to suit the requirement of a particular vehicle.

The operation of the suspension will now be described.

Figure 4:
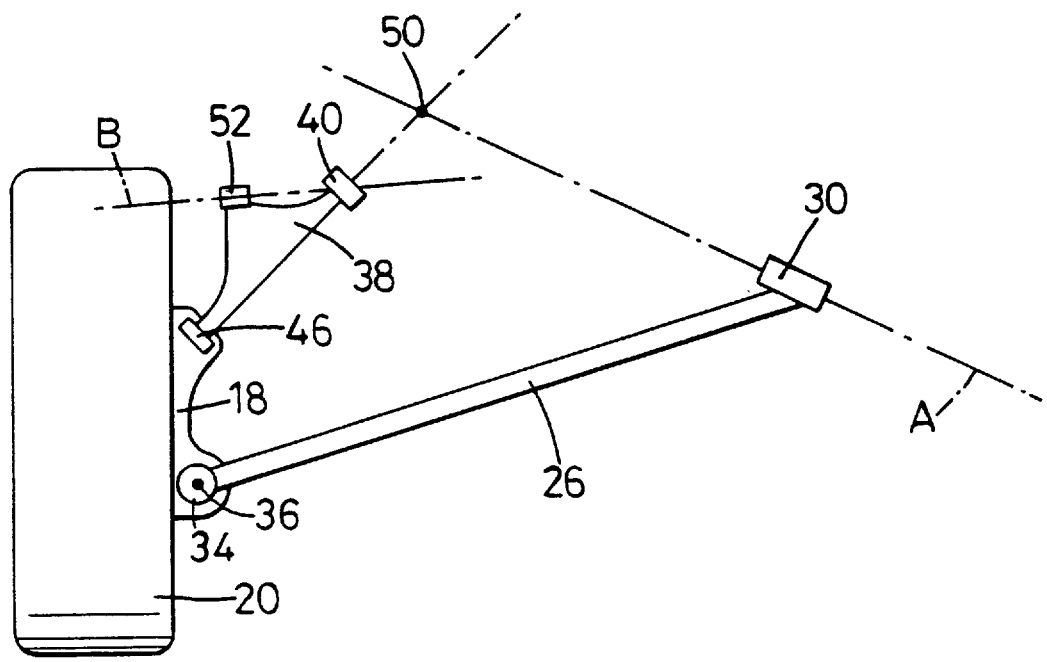
FIG.4: is a plan view of the suspension similar to FIG. 2 showing the suspension in its mean position.
Figure 4A:
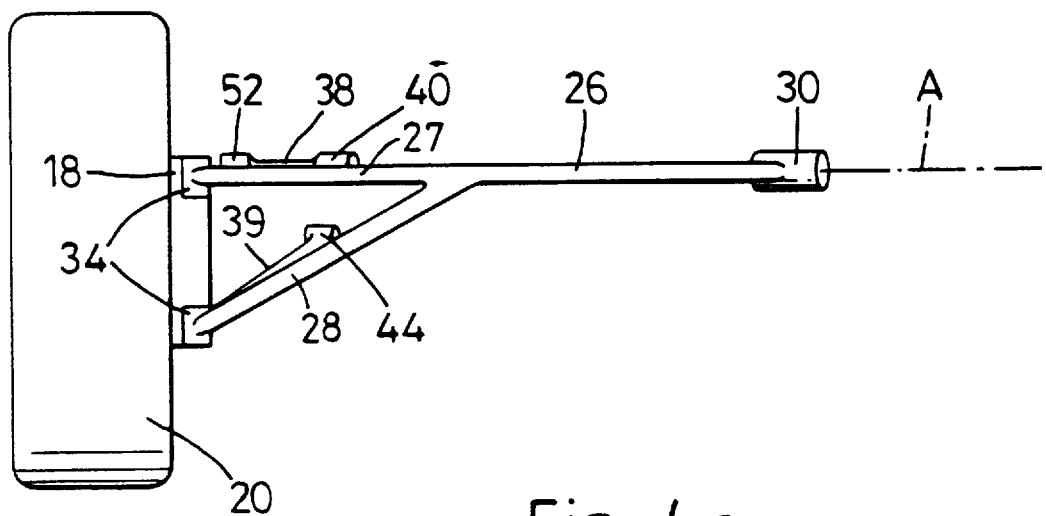
FIG.4a: is a rear view of the suspension in the condition shown in FIG. 4.

As shown in FIGS. 4 and 4a, the first and second arms 26, 38 are substantially horizontal when the suspension is in its mean or at rest position.

Figure 5:
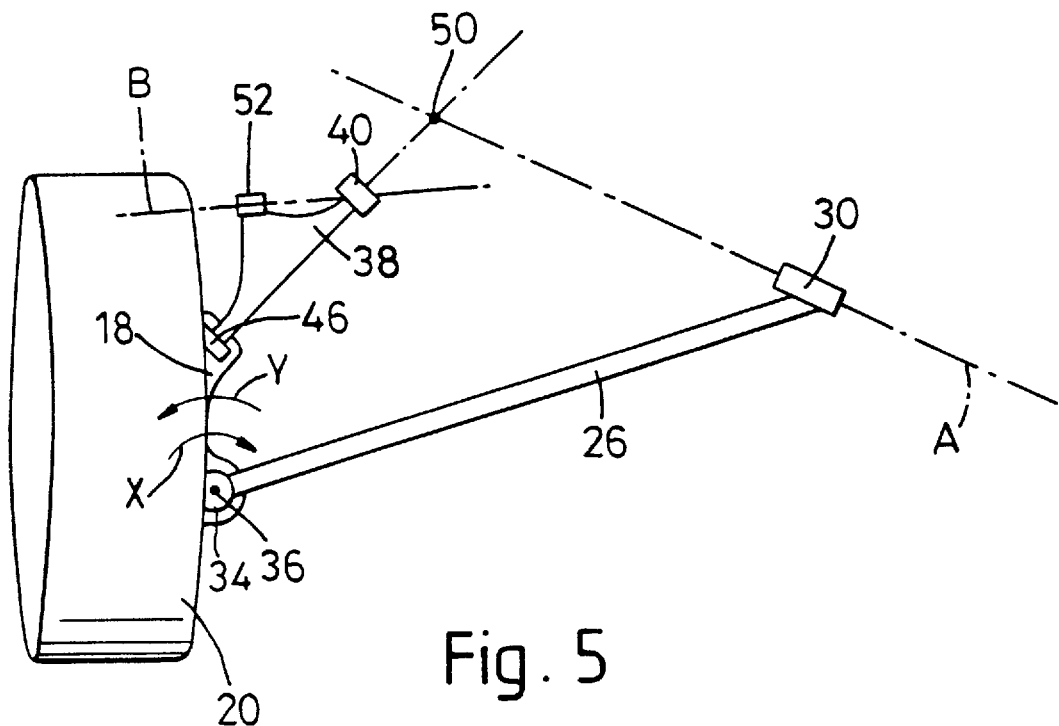
FIG.5: is a view similar to FIG. 4 showing the suspension in bounce.
Figure 5A:
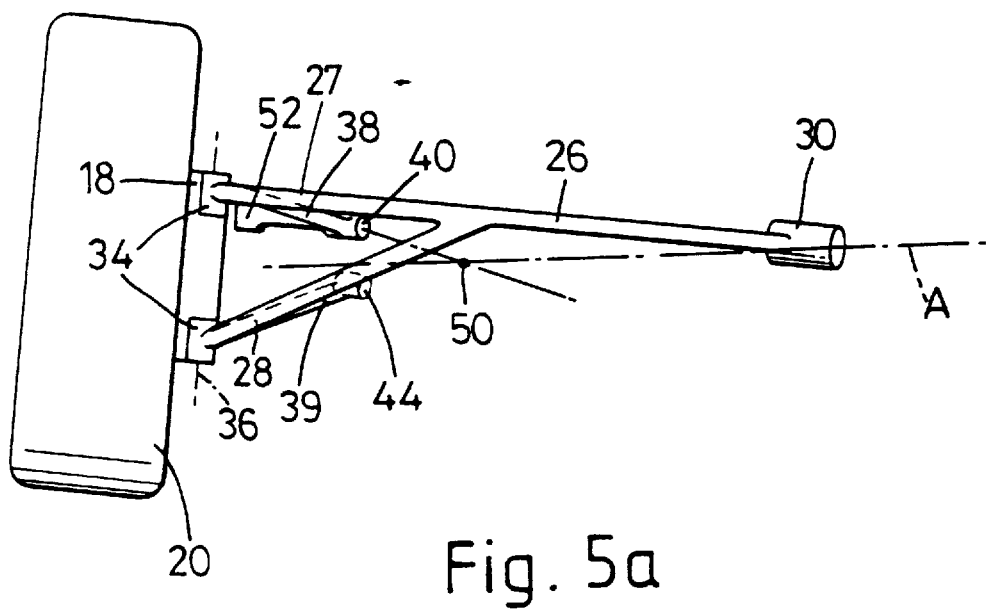
FIG.5a: is a rear view of the suspension in the condition shown in FIG. 5.

As shown in FIGS. 5 and 5a movement of the wheel support 18 and wheel 20 towards the bounce position causes the wheel support 18 to pivot about the axis A. As with known semi-trailing arm suspensions, such movement will result in a change in wheel camber. The amount of camber change will be dependent on the position selected for the virtual pivot point 50 and, therefore, on the vertical spacing between the bearings 40, 42. Although the wheel 20 and wheel support 18 pivot about axis A, the second and third arms 38, 39 actually pivot on their bearings 40,44. During upward movement of the wheel 20 as shown in FIGS. 5 and 5a, the wheel 20 will move upwards and forwards about the axis A and the wheel will undergo a change in camber and steer. In the example shown, the wheel 20 will move in a toe-in direction 'X' during the upward movement. However the presence of the compliance bush 52 modifies the angular movement of the wheel 20 to compensate for the toe-in. During the upward movement of the wheel 20, the arm 38 moves about the axis B which tends to pull the wheel mounting further forwards thereby pivoting the arm 26 about the bearing 30, the arm 38 about the bearing 40 and the arm 39 about the bearing 44. As the arm 26 is longer than the arms 38, 39 and the arm 26 is at a shallower angle to the transverse direction than the arm 38, such movement of the arms causes the bearings 46, 48 to move outwards further than the bearings 34. Therefore a toe-out movement 'Y' of the wheel 20 is generated which compensates at least partly for the toe-in 'X' described above.

Figure 6:
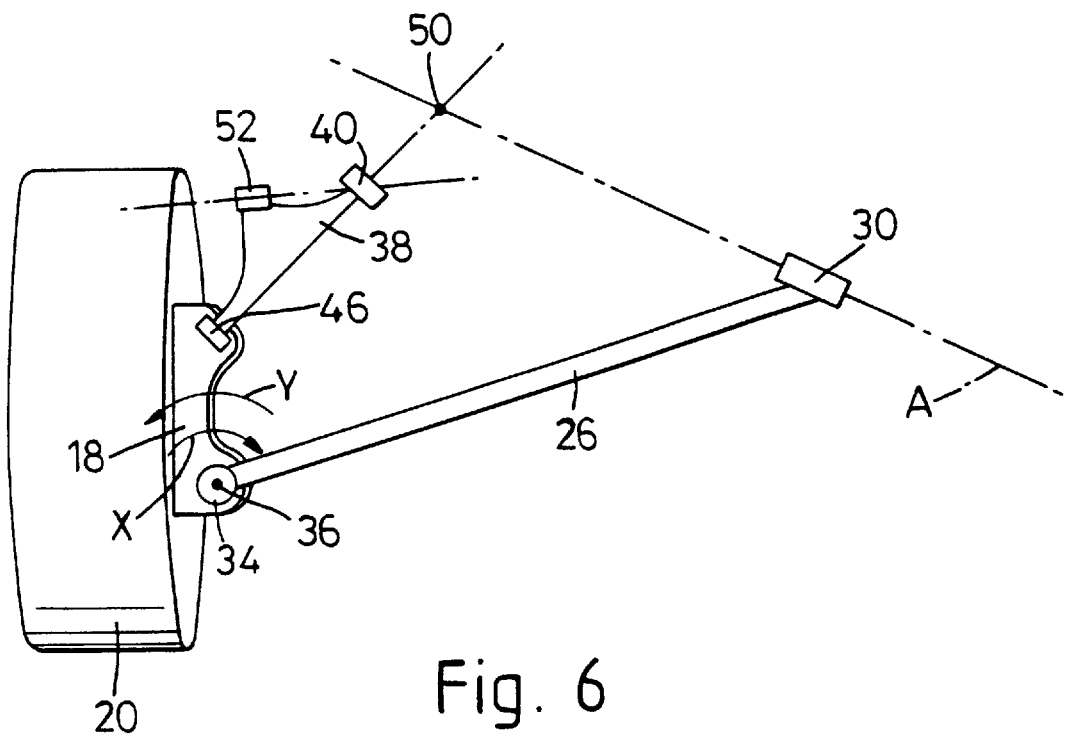
FIG.6: is a view similar to FIG. 4 but showing the suspension in rebound.
Figure 6A:
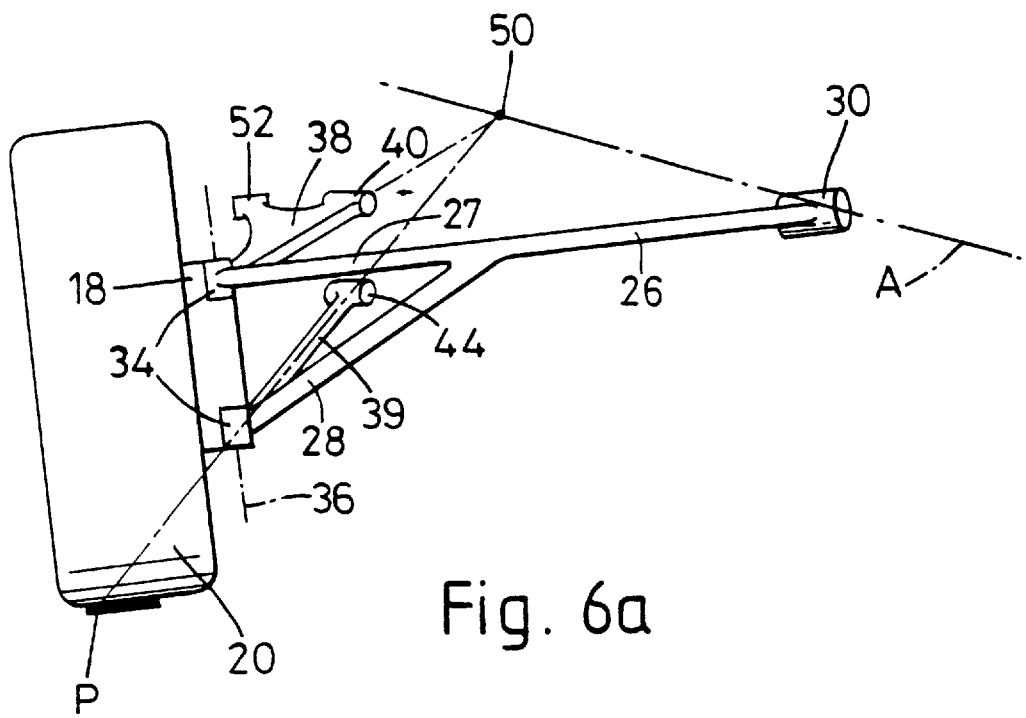
FIG.6a: is a rear view of the suspension in the condition shown in FIG. 6.

When moving into the rebound position as shown in FIGS. 6 and 6a, there is a wheel camber and steer change which will be determined by the position of the virtual pivot 50. The compliance bush 52 again helps to correct toe-in as described with respect to FIGS. 5 and 5a, the bearings 46, 48 effectively moving downwards and forwards.

It will be understood that the position of the compliance bush 52 can be selected to provide the desired amount of bump steer control about axis 36. The virtual pivot point 50 moves upwardly from the mean position during rebound movement as in FIG. 6a.

With semi-trailing arm suspensions, braking and compliance forces applied to the suspension, as indicated at F in FIG. 2, tend to move the wheels 20 rearwardly about the compliant bearings which connect the semi-trailing arm arrangement 25 to the vehicle thereby causing toe-out. A lateral force, indicated at L in FIG. 2, which can result from travelling around a right hand bend in the example shown, can also cause toe-out. The present invention is designed to reduce that problem. In that respect, it will be noted that lines passing through the positions of coupling 30, 34; 40,46 of the first and second arms 26 and 38 to the wheel support 18 and the vehicle body 10 converge in plan towards a point 56 (FIG. 2) outboard of the centre 58 of the wheel 20 and to the rear of the wheel centre 58. Therefore, when a force F or L or a combination of the two is applied to the wheel 20, there will be tendency for the wheel 20 to turn about the point 56 producing toe-in which will help to correct any toe-out.

It will be noted, see for example FIGS. 4a, 5a and 6a, that the upper arm 38 tends to point more towards the wheel centre 58 whereas the lower arm 39 tends to point towards the ground, in particular a contact patch P (FIG. 6a) between the wheel and the ground. Therefore, if braking load F is applied, the majority of that load will be taken by the lower arm 39 and the amount of compliance during braking can be controlled to a certain extent by selecting the compliance of the bearing 44.

The suspension in accordance with the first embodiment of the invention can be used across a range of vehicles as the angle of semi-trail "a" can be set by selecting the distance between the bearings 40, 44 thereby altering the amount of camber change during vertical movement of the wheel. That can easily be achieved by producing a plurality of mounting members 42 with mounting points 42a for the bearings 40, 44 correctly spaced to suit the vehicle on which the suspension is to be mounted.

Although some costs will be incurred in producing different mounting members 42 for various vehicles within the range, the cost involved in doing that is minimal compared to the cost of designing suspension units as a whole to suit individual vehicles. It is envisaged that the vehicle subframe 10 will be kept the same for the whole range of vehicles.

Figure 7:
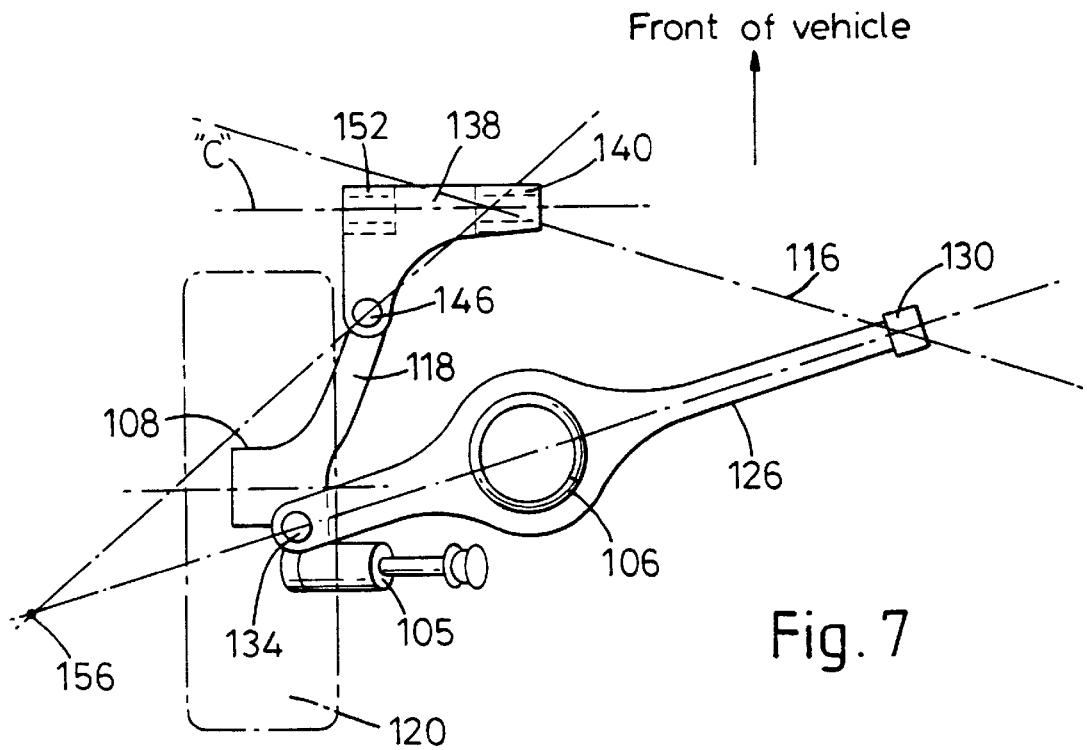
FIG.7: is a diagrammatic plan view of a second embodiment of a semi trailing arm rear suspension in accordance with the invention for the left hand side of the vehicle.
Figure 8:
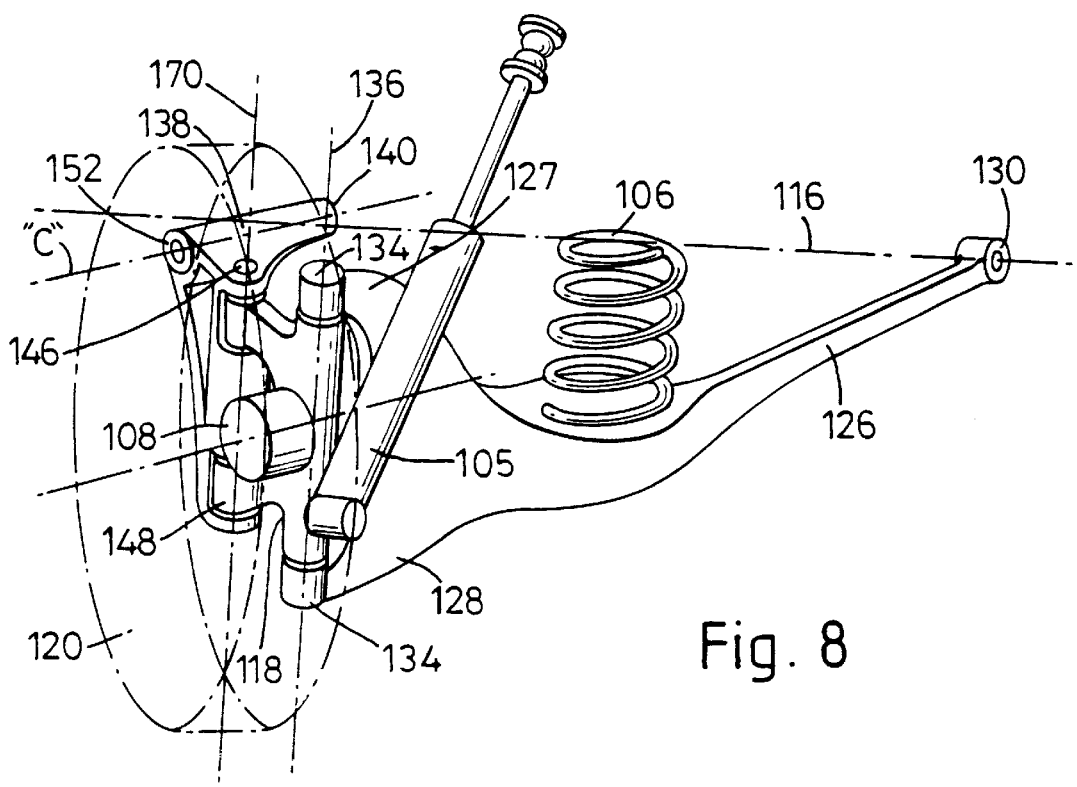
FIG.8: is a diagrammatic perspective view of the semi trailing arm rear suspension shown in FIG. 7.

With reference to FIGS. 7 and 8 there is shown a second embodiment of the invention which in many respects is similar to that described above.

A wheel 120 is rotatably supported by a stub axle 108 extending from a wheel support 118. The wheel support 118 is connected to part of the vehicle body (not shown) by a first arm 126 and by a second arm 138.

To compliantly support the weight of the vehicle body a coil spring 106 is interposed between the first arm 126 and a support (not shown) on the vehicle body. An oleo damper 105 is connected between the wheel support 118 and part of the vehicle body (not shown) to damp out vibrations or oscillations of the vehicle body.

The first arm 126 has upper and lower sections 127, 128 for connection to the wheel support 118 and extends in a generally lateral direction rearwardly and outwardly from where it is pivotally connected at its inboard end via a pivot means 130 to the vehicle body. At its outboard end the lower and upper sections of the first arm 126 are connected to the wheel support 118 by a pair of vertically spaced bearings 134 which define a vertical axis of pivoting 136.

The second arm 138 is connected to the wheel support 118 at one end by a pair of vertically spaced bearings 146, 148 which define a vertical axis of pivoting 170. At the other end the second arm 138 is connected to the vehicle body by second and third linkages. The second linkage is formed by a pivot bearing 140 and the third linkage is formed by a compliance bush 152 of known form.

The compliance bush 152 is connected to the body at a position that lies outwardly from the position where the second arm 138 is connected by the pivot 140 to the body and to the rear of an imaginary line 116 that extends between the pivot 140 and the pivotal connection 130 of the first arm 126 to the vehicle body so that pivotal movement of the second arm 138 takes place about an axis "C".

As described above, compliance forces applied to the suspension tend to move the wheel 120 rearwardly about the compliant bearings which connect the semi-trailing arm arrangement to the vehicle thereby causing toe-out and a lateral force can result from travelling around a bend which can also cause toe-out. To reduce these problems the first arm 126 and the second arm 138, converge such that in plan imaginary lines passing through the positions of coupling 130,134; 140, 146 of the first and second arms 126, 138 to the wheel support 118 and vehicle body intersect at a point 156 (FIG. 7) outboard of and to the rear of the centre of the wheel 120. Therefore, when a compliant or lateral force or a combination of the two is applied to the wheel 120, there will be tendency for the wheel 120 to turn about the point 156 producing toe-in which will help to correct any natural toe-out tendency.

As described above movement of the wheel support 118 and wheel 120 towards the bounce position causes the wheel support 118 to pivot about an axis which will result in a change in wheel camber. The amount of camber change will be dependent on the configuration of the suspension linkage. In the example shown, the wheel 120 would tend to toe-in during the upward movement as the second arm 138 is shorter than the first arm 126. However the presence of the compliance bush 152 which causes pivotal movement of the second arm 138 to take place about the axis "C" modifies the angular movement of the wheel 120 to compensate for the toe-in. In fact during the upward movement of the wheel 120, the arm 138 moves about the axis "C" which tends to pull the wheel mounting further forwards thereby pivoting the arm 126 about the bearing 130 and the arm 138 about the bearing 140. Therefore a toe-out movement of the wheel 20 is generated which compensates at least partly for the toe-in described above.

Wherefore, what is claimed is:

1. A semi-trailing arm suspension for a vehicle, for suspending a body of said vehicle with respect to a wheel of said vehicle, the suspension having;

a wheel support member to rotatably support said wheel about a horizontal axis extending in a direction lateral to the vehicle body;

a spring means for biasing said wheel support member in a downwards direction with respect to said vehicle body, the wheel support being constrained to move about an axis of rotation relative to the vehicle body by a linkage arrangement comprising;

a first arm member having an inboard end coupled to part of the vehicle body for rotation with respect thereto about a generally horizontal rotational axis and an outer end rotatably coupled to said wheel support member such that the wheel support member can rotate about a substantially vertical axis relative to the first arm member, the first arm member extending in a generally lateral direction rearwardly and outwardly with respect to the vehicle body from said inboard end to said outboard end;

a second arm member having a first end coupled to part of the vehicle body for rotation with respect thereto about a generally horizontal axis and a second end coupled to said wheel support member, the first and second arm members converging such that imaginary lines passing through the positions of coupling of the first and second arms to the wheel support and vehicle body intersect at a point outside of the center of the wheel and to the rear of the axis of rotation of the wheel; and a third linkage between said vehicle body and said wheel support, the third linkage being connected to part of the vehicle body at a position that lies outwardly from the position at which the second arm is coupled to the vehicle body and to the rear of an imaginary line extending between the position of connection of the first arm to the body and the position of connection of the second arm to the vehicle body such that the third linkage will tend to cause the wheel carrier to rotate about said substantially vertical axis in response to vertical movement of the wheel relative to the vehicle body.

2. A suspension as claimed in claim 1 in which the connection of the third linkage to the wheel support is made via the second arm.

3. A suspension as claimed in claim 2 in which the third linkage and the second arm are formed as a single structural member.

4. A suspension as claimed in claim 2 in which the connection between the third linkage and the vehicle body is made by means of a compliance bush.

5. A suspension as claimed in claim 1 in which the third linkage is formed by a separate structural member coupled to the body of the vehicle by a compliance bush and to the wheel support by a pivot means.

6. A suspension as claimed in claim 1 in which the third linkage is formed by a separate structural member coupled to the wheel support by a compliance bush and to the body of the vehicle by a pivot means.

7. A suspension as claimed in claim 3 in which the second arm is connected to the wheel support at two vertically separated positions.

8. A suspension as claimed in claim 1 in which the second arm is connected to the wheel support for rotation about a vertical axis.

9. A suspension as claimed in claim 1 in which the linkage arrangement further comprises a third arm having a first end coupled to part of the vehicle body for rotation with respect thereto about a generally horizontal axis and a second end coupled to said wheel support member, the second and third arm members converging such that imaginary extensions thereof intersect at a point of intersection which lies forwardly with respect to an imaginary line extending from the position of connection of the first arm to the vehicle body and the position of connection of the second arm to the vehicle body so that the axis of rotation about which the wheel support is constrained to move relative to the vehicle body extends from said point of intersection to the position of connection of the first arm to the body.

10. A suspension as claimed in claim 9 in which the positions of connection of the second and third arms to the vehicle body are vertically disposed with respect to each other.

11. A suspension as claimed in claim 9 in which the positions of connection of the second and third arms to the wheel support are vertically disposed with respect to each other.

12. A suspension as claimed in claim 10 in which the second and third arms are connected to the vehicle body by a mounting means which can be selected from a number of mounting means each of which provides a different vertical distance between the positions of connection of the second and third arms thereby allowing the position of the point of intersection to be selected to suit the dynamic characteristics required for a particular vehicle of a range of vehicles.

13. A suspension as claim in claim 3 in which the connection between the third linkage and the vehicle body is made by means of a compliance bush.

14. A suspension as claimed in claim 3 in which the second arm is connected to the wheel support for rotation about a vertical axis.

15. A suspension as claimed in claim 8 in which the second arm is connected to the wheel support for rotation about a vertical axis.

16. A suspension according to claim 1 wherein the first arm member is longer than the second arm member.

17. A suspension according to claim 1 wherein the first arm member is to the rear of the second arm member.

18. A suspension according to claim 17 wherein the outer end of the first arm member is coupled to the wheel support member at a point to the rear of that at which the second end of the second arm member is coupled to the wheel support member.

19. A suspension according to claim 1 wherein the wheel is movable vertically relative to the vehicle body between a bump position and a rebound position as a result of rotation of the linkage arrangement relative to the vehicle body about its axis of rotation, and wherein the rotation of the wheel carrier caused by the third linkage will tend to reduce toe-in of the wheel caused by such rotation of the linkage arrangement as the wheel moves towards at least one of the bump position and the rebound position.

* * * * *